US012736651B2

(12) United States Patent
Jantzi et al.

(10) Patent No.: US 12,736,651 B2
(45) Date of Patent: Sep. 15, 2026

(54) SYSTEM AND METHOD FOR DETECTION OF CONTAINER PRESENCE ON CHASSIS

(71) Applicant: BlackBerry Limited, Waterloo (CA)

(72) Inventors: Jason Wayne Jantzi, St. Clements (CA); Mahendra Fuleshwar Prasad, Waterloo (CA); Cortez Corley, Waterloo (CA)

(73) Assignee: BlackBerry Limited, Waterloo (CA)

( * ) Notice: Subject to any disclaimer, the term of this patent is extended or adjusted under 35 U.S.C. 154(b) by 302 days.

(21) Appl. No.: 18/402,075

(22) Filed: Jan. 2, 2024

(65) Prior Publication Data

US 2025/0164627 A1 May 22, 2025

Related U.S. Application Data

(60) Provisional application No. 63/601,824, filed on Nov. 22, 2023.

(51) Int. Cl.
*G01S 13/06* (2006.01)
*G01S 7/00* (2006.01)

(52) U.S. Cl.
CPC .............. *G01S 13/06* (2013.01); *G01S 7/003* (2013.01)

(58) Field of Classification Search
None
See application file for complete search history.

(56) References Cited

U.S. PATENT DOCUMENTS

2008/0272923 A1* 11/2008 Breed .................... G06F 3/0233 340/632
2016/0139264 A1* 5/2016 Larocque ................ G01S 7/023 367/101
2018/0361994 A1 12/2018 Seaman et al.
(Continued)

FOREIGN PATENT DOCUMENTS

CA 3127542 8/2020
CN 113885033 A * 1/2022 ........... G01S 7/4808
(Continued)

OTHER PUBLICATIONS

Machine translation of CN-113885033-A (Year: 2022).*
BlackBerry Radar H2 (2020). BlackBerry. https://www.blackberry.com/content/dam/blackberry-com/Documents/pdf/radar/blackberry-radar-h2-overview.pdf (Year: 2020).*
(Continued)

*Primary Examiner* — Vladimir Magloire
*Assistant Examiner* — Anna K. Gosling
(74) *Attorney, Agent, or Firm* — Conley Rose, P.C.

(57) ABSTRACT

An asset detection device and method of using a mmWave radar to determine whether a container is mounted to a transport chassis. The reflected signal may include multiple peaks and may be ambiguous. The device may determine if a peak is within a container range and is above a threshold magnitude. If the peak is not the highest peak in the reflected signal the device may disambiguate the signal by filtering it using a stored average no-container signal. If the peak is not the highest peak in the reflected signal the device may disambiguate the signal by determining if the highest peak is due to multipath. In some cases no peaks may be both above the threshold and within the container range, in which case the device determines there is no container present. The device reports container status determinations and reflected signal analysis to a remote server.

21 Claims, 7 Drawing Sheets

(56) References Cited

U.S. PATENT DOCUMENTS

| | | | |
|---|---|---|---|
| 2019/0279494 A1 | 9/2019 | Raasch et al. | |
| 2023/0014528 A1 | 1/2023 | Grohman et al. | |
| 2023/0017983 A1* | 1/2023 | Kunz .................... | G01S 13/931 |

FOREIGN PATENT DOCUMENTS

| | | |
|---|---|---|
| DE | 4211936 | 10/1993 |
| JP | 2011000987 | 1/2011 |
| JP | 5482213 | 5/2014 |
| KR | 20210117770 | 9/2021 |
| KR | 20220056012 | 5/2022 |
| KR | 20220118132 | 8/2022 |

OTHER PUBLICATIONS

Blackberry Radar R2 (2020). BlackBerry. https://www.blackberry.com/content/dam/bbcomv4/blackberry-com/en/products/blackberry-radar/BlackBerry-RadarR2-Cargo-Percentage-Detection-1202.pdf(Year: 2020).*

Blackberry Radar R2 Chassis-Container on/off Detection Installation Guide (2021). Blackberry. https://docs.radar.blackberry.com/guides/BlackBerry_Radar_R2_Installation_Guide_Chassis_Container_On_Off_Detection.pdf (Year: 2021).*

Li, Xingyi, et al.; "4D Radar-Based Pose Graph SLAM With Ego-Velocity Pre-Integration Factor"; IEEE; Aug. 2023; 13 pages.

Liu, Jiangang, et al.; "Sidewall Detection Using Multipath in Through-Wall Radar Moving Target Tracking"; IEEE; Jun. 2015; 5 pages.

European Extended Search Report; Application No. 24214783.3; Mar. 23, 2025; 10 pages.

* cited by examiner

SYSTEM AND METHOD FOR DETECTION OF CONTAINER PRESENCE ON CHASSIS

CROSS-REFERENCE TO RELATED APPLICATIONS

The present application claims priority to U.S. Provisional Patent Application No. 63/601,824 filed Nov. 22, 2023, the contents of which are hereby incorporated by reference.

FIELD

The present application relates to the field of asset tracking devices, and more specifically, to methods and systems of detecting container presence on a chassis.

BACKGROUND

Asset tracking devices may sometimes include a mechanism for determining whether a container is mounted to a chassis. The chassis can be a train chassis, a truck chassis, or some other chassis related to transport that is configured to support a container, where the container is a structure intended to house or transport cargo. The mechanism for detecting container presence may include a container detection device, such as a strain gauge or a wireless proximity detection device.

BRIEF DESCRIPTION OF FIGURES

Reference will now be made, by way of example, to the accompanying drawings in which.

Like reference numerals are used in the drawings to denote like elements and features.

DESCRIPTION OF EXAMPLE EMBODIMENTS

Figure 1:
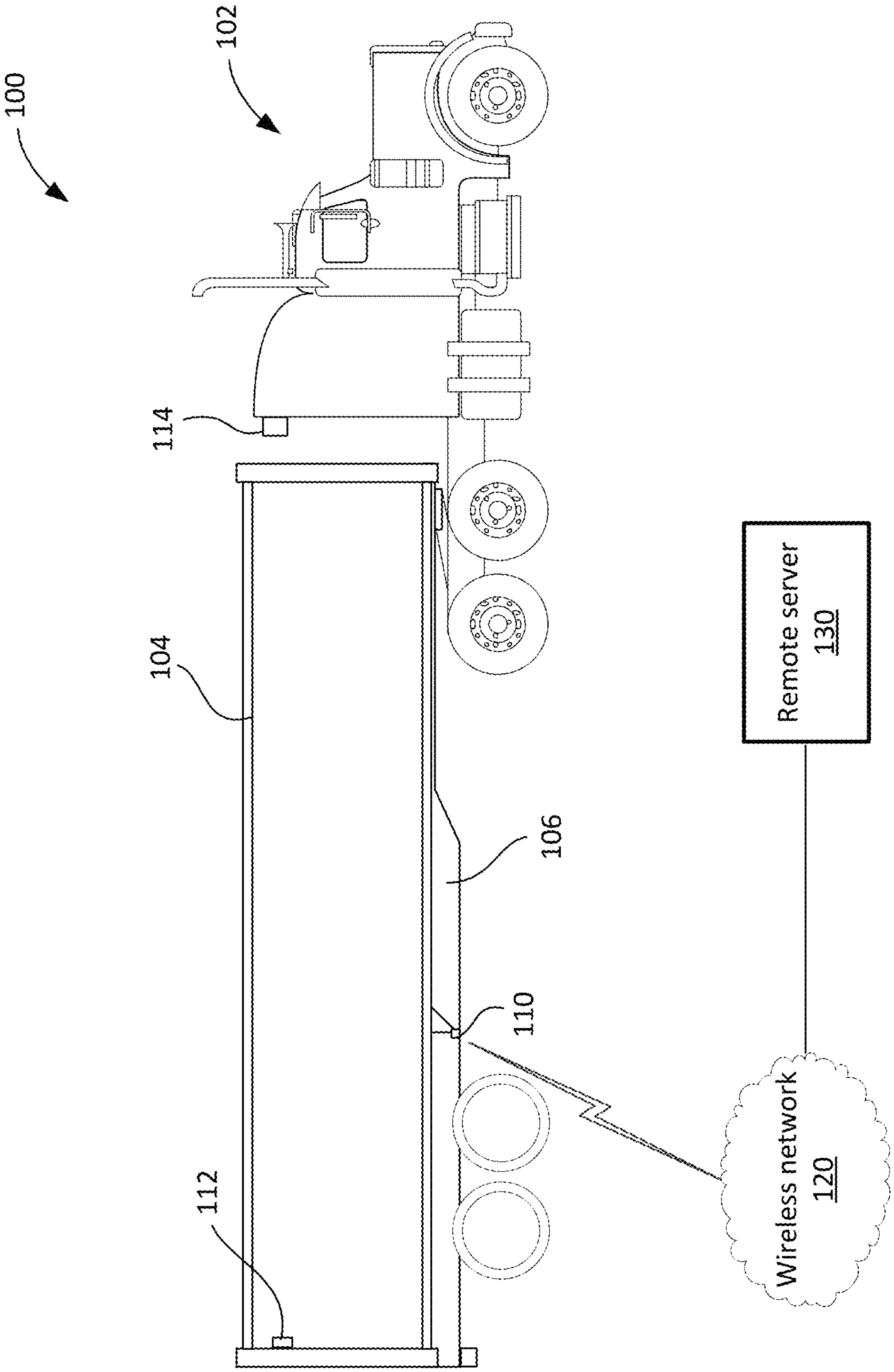
FIG. 1 shows an example system for asset tracking.

In one aspect, the present application describes a device for mounting to a transport chassis to detect whether a container is mounted on the transport chassis. The device may include a mmWave radar to transmit a mmWave signal upwards from a mounting location on the transport chassis and to receive a reflected signal; a wireless communication system; and a processor configured to execute stored processor-executable instructions. When executed, the instructions are to cause the processor to: identify a plurality of peaks in the reflected signal; determine that a highest peak is reflected from a first distance outside a container range; determine that a second highest peak is reflected from a second distance within the container range and at a magnitude greater than a minimum threshold, thereby indicating a detected container; determine, based on the first distance and the second distance whether the highest peak is a multipath reflection; and transmit a message to a remote server via the wireless communication system reporting detection of a container and the multipath reflection.

In some implementations, the instructions, when executed, are to cause the processor to determine the highest peak is a multipath reflection by determining that the second distance is twice the first distance plus or minus a variance.

In some implementations, the instructions, when executed, are to cause the processor to identify the peaks by retrieving a stored average no-container signal and filtering the reflected signal using the stored average no-container signal to obtain a filtered signal. Filtering may include subtracting in-phase and quadrature phase no-container signals from corresponding in-phase and quadrature phase components of the reflected signal.

In some implementations, the instructions, when executed, are to cause the processor to receive a second reflected signal; determine no peaks in the second reflected signal are above the threshold and within the container range; and transmit a no-container determination to the remote server.

In some implementations, wherein the instructions, when executed, are to further cause the processor to, based on the no-container determination, update a stored average no-container signal.

In some implementations, the instructions, when executed, are to further cause the processor to, in response to the detected container, initiate short-range wireless pairing with a container-mounted asset tracking device.

In yet another aspect, the present application describes a device for mounting to a transport chassis to detect whether a container is mounted on the transport chassis. The device may include a mmWave radar to transmit a mmWave signal upwards from a mounting location on the transport chassis and to receive a reflected signal; a wireless communication system; and a processor configured to execute stored processor-executable instructions. When executed, the instructions are to cause the processor to: identify a plurality of peaks in the reflected signal; determine that none of the plurality of peaks are both within a container range and have a magnitude greater than a first threshold; based on that determination, retrieve a stored average no-container signal and filter the reflected signal using the stored average no-container signal to obtain a filtered signal; detect, within the filtered signal, a peak within the container range and having a magnitude greater than a second threshold; and transmit a message to a remote server via the wireless communication system reporting detection of a container.

In some implementations, the first threshold is higher than the second threshold, and in some implementations, the first threshold is the same as the second threshold.

In some implementations, the instructions, when executed, are to cause the processor to filter by subtracting in-phase and quadrature phase no-container signals from corresponding in-phase and quadrature phase components of the reflected signal.

In some implementations, the instructions, when executed, are to cause the processor to identify the peaks by retrieving a stored average no-container signal and filtering the reflected signal using the stored average no-container signal to obtain a filtered signal. Filtering may include subtracting in-phase and quadrature phase no-container signals from corresponding in-phase and quadrature phase components of the reflected signal. In some cases, the instructions, when executed, are to further cause the processor to, based on the no-container determination, update the stored average no-container signal.

In some implementations, the instructions, when executed, are to further cause the processor to, in response to the detected container, initiate short-range wireless pairing with a container-mounted asset tracking device.

In some implementations, the container range is defined by a minimum distance and a maximum distance.

In some implementations, the instructions, when executed, are to further cause the processor to, based on the determination that none of the plurality of peaks are both within the container range and have a magnitude greater than the first threshold, modify one or more parameters and retest for container presence.

In a further aspect, the present application describes a device for mounting to a transport chassis to detect whether a container is mounted on the transport chassis. The device may include a mmWave radar to transmit a mmWave signal upwards from a mounting location on the transport chassis and to receive a reflected signal; a wireless communication system including a cellular data system and a short-range wireless system; and a processor configured to execute stored processor-executable instructions. When executed, the instructions are to cause the processor to: determine that at least one peak in the reflected signal is both within a container range and has a magnitude greater than a minimum threshold; based on that determination, transmit a message to a remote server via the wireless communication system reporting detection of a container; and initiate, using the short-range wireless system, a pairing operation with a container-mounted short-range device based on the detection of the container.

In some implementations, the instructions, when executed, are to cause the processor to determine that at least one peak in the reflected signal is both within the container range and has a magnitude greater than the minimum threshold by evaluating up to three of the highest peaks in the reflected signal.

In some implementations, the instructions, when executed, are to cause the processor to initiate the pairing operation in response to an instruction from the remote server.

In some implementations, the at least one peak in the reflected signal that is both within the container range and has a magnitude greater than the minimum threshold is not a highest peak in the reflected signal and wherein the instructions, when executed, are to cause the processor to determine whether the highest peak in the reflected signal is a likely multipath signal. In some cases, the instructions, when executed, are to cause the processor to determine that the highest peak in the reflected sign is the likely multipath signal by determining that the highest peak corresponds to a distance twice the distance of the at least one peak plus or minus a variance.

In yet a further aspect, the present application describes a method of detecting whether a container is mounted on a transport chassis using a chassis-mounted device. The method may include transmitting a mmWave signal upwards from a mounting location on the transport chassis and receiving a reflected signal; identifying a plurality of peaks in the reflected signal; determining that a highest peak is reflected from a first distance outside a container range; determining that a second highest peak is reflected from a second distance within the container range and at a magnitude greater than a minimum threshold, thereby indicating a detected container; determining, based on the first distance and the second distance whether the highest peak is a multipath reflection; and transmitting a message to a remote server via a wireless communication system reporting detection of a container and the multipath reflection.

According to another aspect, the present application discloses a non-transitory computer readable storage medium containing computer-executable instructions which, when executed, configure a processor to carry one or more of the methods described herein.

Other aspects and features of the present application will be understood by those of ordinary skill in the art from a review of the following description of examples in conjunction with the accompanying figures.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements. The term "and/or" is intended to indicate that either of the two elements may be included or both of the elements may be included.

In telematics/transportation industry, asset tracking is used to maintain a near-real-time understanding of where various assets are located. Asset tracking devices may be attached to containers (e.g. shipping containers), transport vehicles (e.g. trucks/tractors or train engines), and/or transport chassis (e.g. truck chassis or train chassis designed to carry one or more containers). Not all asset tracking devices have full features of all devices. For instance, some devices may not have cellular data systems for communication with a remote server and instead may have a short-range wireless system for connecting to another asset tracking device that has a cellular data connection.

An enterprise can manage a fleet of transport chassis. Examples of enterprises include shippers, manufacturers, distributors, retailers, individuals, or any other entity that is responsible for managing a fleet of transport chassis. The fleet of transport chassis can be owned by one or more other entities. The transport chassis of the fleet may be dispersed across a number of geographic locations (e.g., in many cities, states, provinces, countries, etc.).

One of the data points of value is whether a container is mounted to a chassis; that is, whether the chassis is loaded or unloaded. The remote server will typically make available information to an enterprise customer regarding which containers are mounted to which chassis. Moreover, the mounting or removal of a container from a chassis may trigger other operations or actions, such as the enabling or disabling of GNSS reporting, certain sensor activities, a mode of operation such as a frequency of reporting, and/or short-range wireless pairing. Determining the load status (loaded status or unloaded status) of a transport chassis can be useful for various purposes, including tracking usage of each transport chassis, determining billing for a transport chassis (e.g., computing an amount to bill a customer for actual use of a transport chassis to deliver a container and/or cargo of the customer), determining a maintenance schedule for a transport chassis (e.g., determining when the transport chassis should be taken to a maintenance facility for maintenance), detecting theft of the transport chassis, and so forth.

Determining whether a container is mounted to a chassis appears to be a relatively simple problem to resolve, however mechanical sensors are prone to failure or require repair/replacement. Wireless sensors have difficultly with multiple objects or obstructions in a field of view and resulting ambiguities in the signal.

In accordance with one aspect, the present application provides a solution through installing a container detection device in an appropriate location to minimize false object detection. In another aspect, the present application provides a solution through resolving container presence/absence ambiguity by filtering unwanted objects based on distance, magnitude threshold and/or using noise cancellation.

Reference is first made to FIG. 1 which shows an example system 100 for asset tracking. The system 100 in this example includes a transport chassis 106 attached to a tractor 102. The transport chassis 106 is loaded with a container 104. The transport chassis 106 includes an asset tracking device 110. The container 104 may also include an asset tracking device 112, and the tractor 102 may include an asset tracking device 114. The asset tracking devices 110, 112, 114 may include short range wireless communications capabilities that enable the asset tracking devices 110, 112, 114 to connect to each other to exchange data. The asset tracking devices 110, 112, 114 may include location tracking devices, such as a global navigation satellite system (GNSS) chip, an accelerometer, a gyroscope, or other such inertial sensors. In some cases, one or more of the asset tracking devices 110, 112, 114 may include other sensors, such as a temperature sensor, a humidity sensor, a dust sensor, an ambient light sensor, a proximity sensor, etc. Although the asset tracking devices 110, 112, 114 are illustrated as being in particular locations on the tractor 102, the container 104, and the transport chassis 106, they may be positioned elsewhere and they may include more than one device. In some cases, a master device may be used and one or more slave devices may be mounted elsewhere and wirelessly paired to the master device. The slave devices may have particular sensor packages designed to determine certain parameters that are reported to the master device.

In some cases, one or more of the asset tracking devices 110, 112, 114 includes a cellular communication subsystem that enables it to establish a data connection with a wireless network 120, such a cellular network. Through the wireless network 120, one or more of the asset tracking devices 110, 112, 114 may exchange data and communications with a remote server 130. The remote server 130 may communicate with a plurality of deployed asset tracking devices over a wide geographical area and may maintain records of the locations of the various devices and pairings between devices that are associated, such as a tractor with a particular transport chassis and/or with a particular container.

The wireless network 120 may operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G), sixth generation (6G), or further evolutions of cellular data networks. In additional examples, other communication network protocols may be used together with or instead of cellular data communications, such as the Institute of Electrical and Electronic Engineers (IEEE) 802.11 or Wi-Fi Alliance Specifications, a Bluetooth™ link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

The asset tracking devices 110, 112, 114, may be configured to wake up and determine their respective locations periodically. The frequency with which the devices wake up may vary depending on context. For example, if the device is in motion as determined by an accelerometer or other sensor, it may be configured to determine its location more frequently than if the device is stationary. One or more of the asset tracking devices 110, 112, 114, may be configured to establish a data connection with the wireless network 120 in order to transmit a location report to the remote server 130 periodically. The periodicity of reporting may differ from, and may typically be longer than, the periodicity with which the devices determine location.

The asset tracking device 110 mounted to the transport chassis 106 may be configured to determine whether the container 104 is present or absent. That is, it may determine whether the transport chassis 106 is loaded or unloaded. In the examples below, the asset tracking device 110 is mounted to a frame or cross-beam of the transport chassis 106 and it includes a radio frequency (RF) sensor oriented to transmit a signal upwards from the mounting location of the asset tracking device 110. The RF sensor receives a reflected signal and the asset tracking device 110 determines from the reflected signal whether there is a container mounted to the transport chassis 106 or not.

Figure 2:
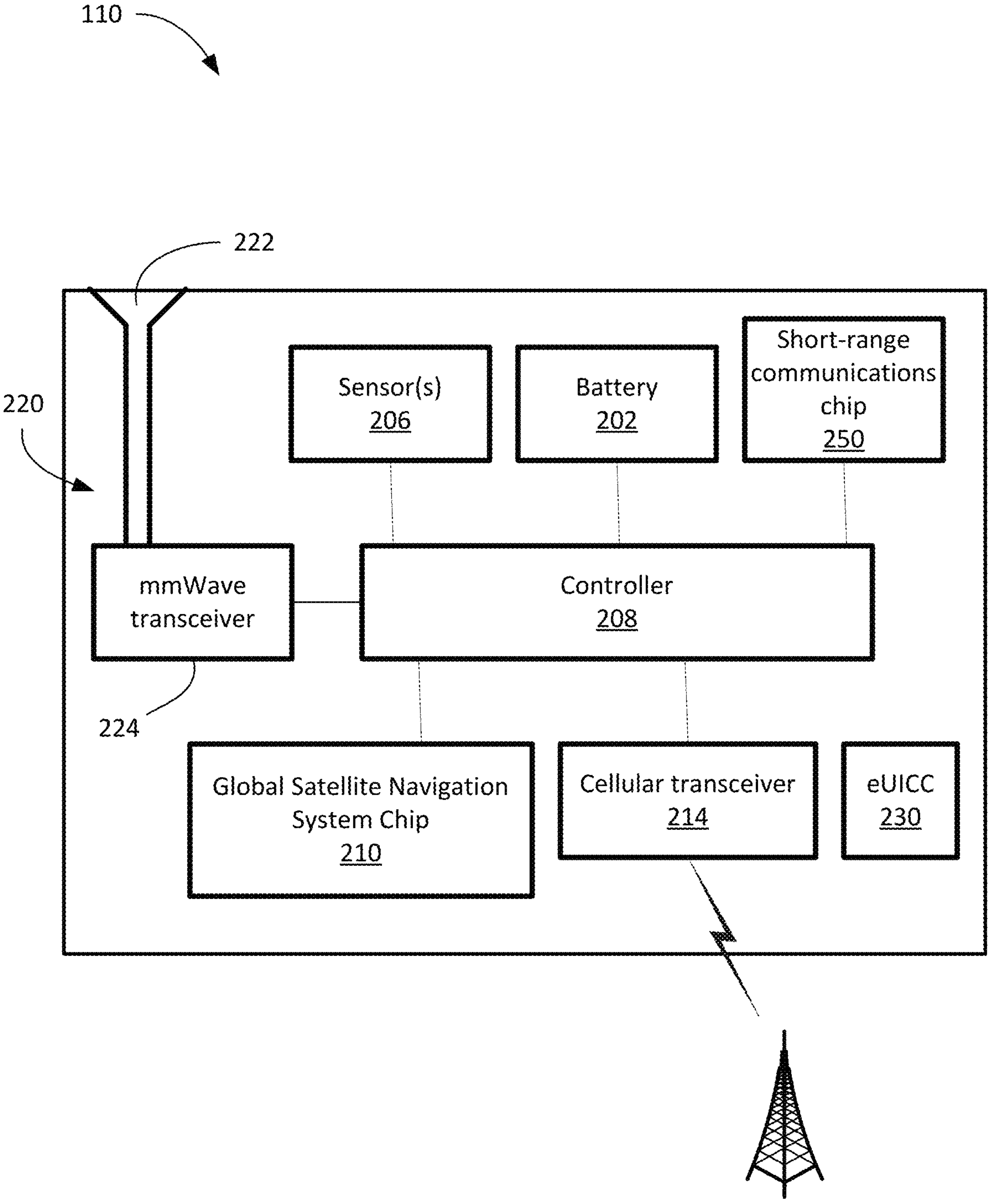
FIG. 2 shows, in block diagram form, one simplified example of an asset tracking device.

Reference is now made to FIG. 2 which shows, in block diagram form, one simplified example of the asset tracking device 110. The asset tracking device 110 may include one or more batteries 202 to power the asset tracking device 110. Battery 202 may be rechargeable or replaceable in some implementations, and the asset tracking device 110 may further include battery charging circuitry (not shown) to receive charge from an external power source.

The asset tracking device 110 in this example contains one or more sensors 206, a controller 208, a GNSS chip 210, a cellular signal transceiver 214, and a short-range communication system, which in this example is a short-range communications chip 250. The one or more sensors 206 may include environmental sensors, such as IMUs, temperature sensors, humidity sensors, dust sensors, chemical sensors, etc. In some cases, the one or more sensors 206 may include an orientation sensor, such as a tri-axis accelerometer or other inertial sensor.

The controller 208 may, in some embodiments, be a microprocessor that may be coupled to memory (not pictured). In some cases, the controller 208 may be a microcontroller, an application-specific integrated circuit (ASIC), or another such processing unit. The controller 208 may include a timer and may be configured to awaken from a sleep mode based on the timer. The controller 208 may be configured to determine when to power up the GNSS chip 210 and/or cellular signal transceiver 214, and to obtain and store in memory location data and other data from either the GNSS chip 210 or the cellular signal transceiver 214. The controller 208 may control the cellular signal transceiver 214 and cause it to obtain a data connection with a cellular tower to connect to a mobile network and to send and receive data with the remote server (not shown).

The GNSS chip 210 receives location data from a plurality of satellites. The GNSS chip 210 may operate in accordance with one or more satellite location determination protocols, such as the Global Positioning System (GPS), Global Navigation Satellite System (GLONASS), BeiDou Navigation Satellite System, Galileo Satellite Navigation System, Indian Regional Navigation Satellite System (IRNSS)/NavIC, or others. The GNSS chip 210 may be configured to determine, based on received satellite signals from three or more satellites, and output a set of geographic coordinates representing the geolocation of the asset tracking device 110.

The cellular signal transceiver 214 receives data from signals broadcast by a plurality of cellular signal towers. This data may include cellular tower identifiers, mobile network identifiers, mobile operator identifiers, timestamps, received signal strength measurements, and other such data. The asset tracking device 110 or the remote server (not shown) may be configured to determine a geolocation from the data using cellular triangulation.

The short-range communications chip 250 may include one or more short-range communications technologies, such as Wi-Fi, Bluetooth™, low-power wide-area network (LPWAN) technology, or other such technologies. In some cases, the short-range communications chip 250 may be used by the asset tracking device 110 to connect with and exchange communications with a nearby sensor unit or other peripheral related to the asset tracking device 110, or with other asset tracking devices in the vicinity.

The geolocation data, cellular data, sensor data, and other data collected by the controller 208 may be saved in memory on the asset tracking device 110 together with a timestamp. The controller 208 may then cause the systems of the asset tracking device 110 to re-enter a sleep mode until next triggered by the timer and/or an inertial measurement unit. When the controller 208 determines that a location report is to be sent to the remote server, it may cause the cellular signal transceiver 214 to establish a wireless data connection with a mobile network, and to transmit a message to the remote server containing the location report and providing data, such as geolocation data, cellular data, sensor data, and other data.

The asset tracking device 110, in some embodiments, may include an eSIM or eUICC 230 (embedded universal integrated circuit card) configured to permit the storage of more than one network profile and the remote provisioning of a network profile (e.g., mobile network credentials) in an over-the-air wireless provisioning operation. The eUICC 230 provides the cellular signal transceiver 214 with the network credentials for enabling establishment of a data connection with a particular mobile network operator. The credentials are associated with a mobile network plan governing the access to which the asset tracking device 110 is entitled to the mobile network and the billing plan associated with network communications by the asset tracking device 104.

In this example, the asset tracking device 110 further includes a millimeter wave (mmWave) radar 220. The mmWave radar 220 may include a mmWave transceiver 224 and a mmWave antenna 222. The mmWave antenna 222 may be an antenna array in some cases. The mmWave antenna 222 may be a horn antenna or lens or other mmWave waveguide type of antenna.

The asset tracking device 110 is oriented to project the mmWave signal upwards from the mounting location on the transport chassis 106 (FIG. 1) to detect objects above the transport chassis 106. In this manner, the mmWave radar 220 is configured for use in detecting presence of the container 102 (FIG. 1).

Figure 3:
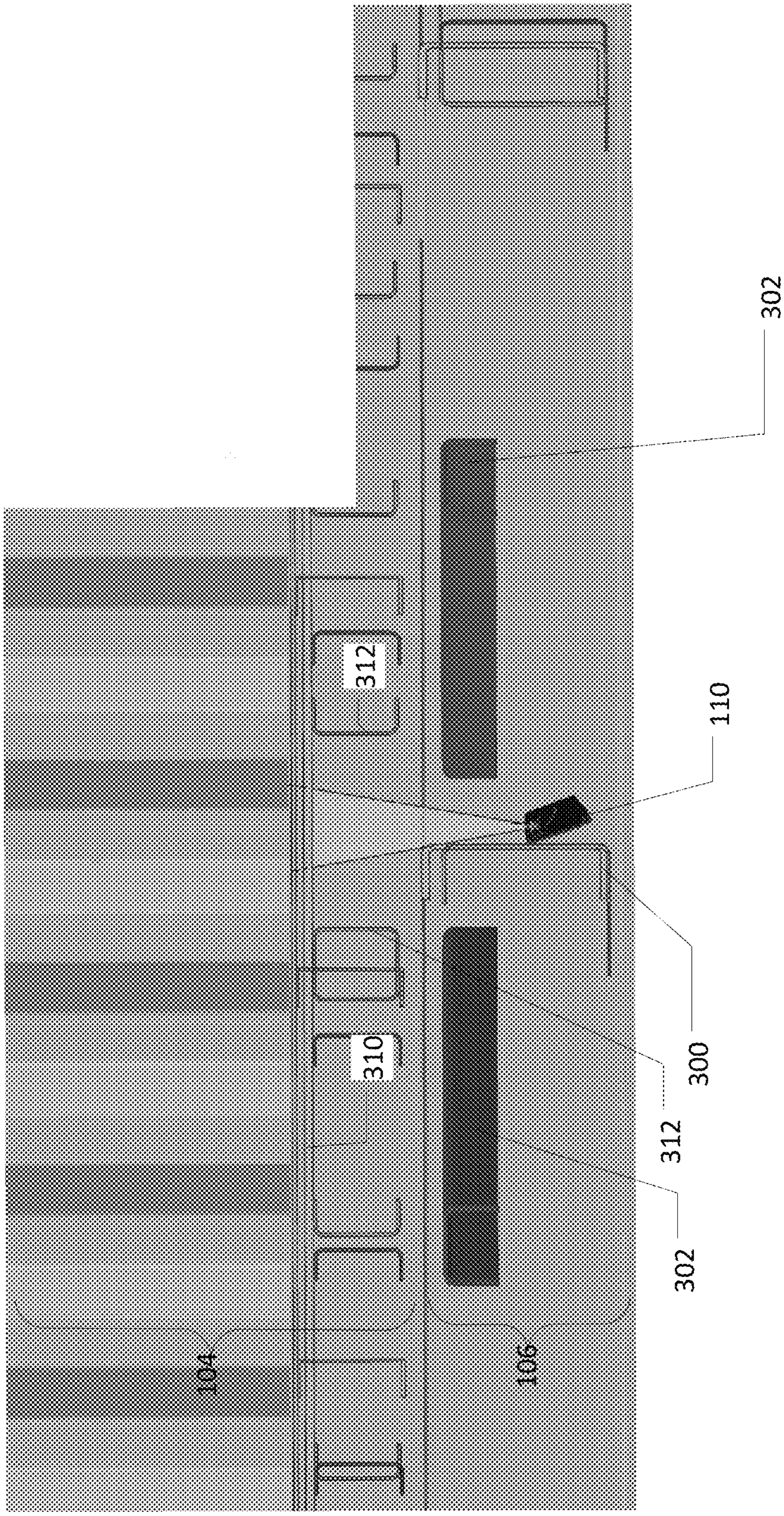
FIG. 3 shows diagrammatically illustrate an example of mounting of an asset tracking device to a transport chassis.
Figure 4:
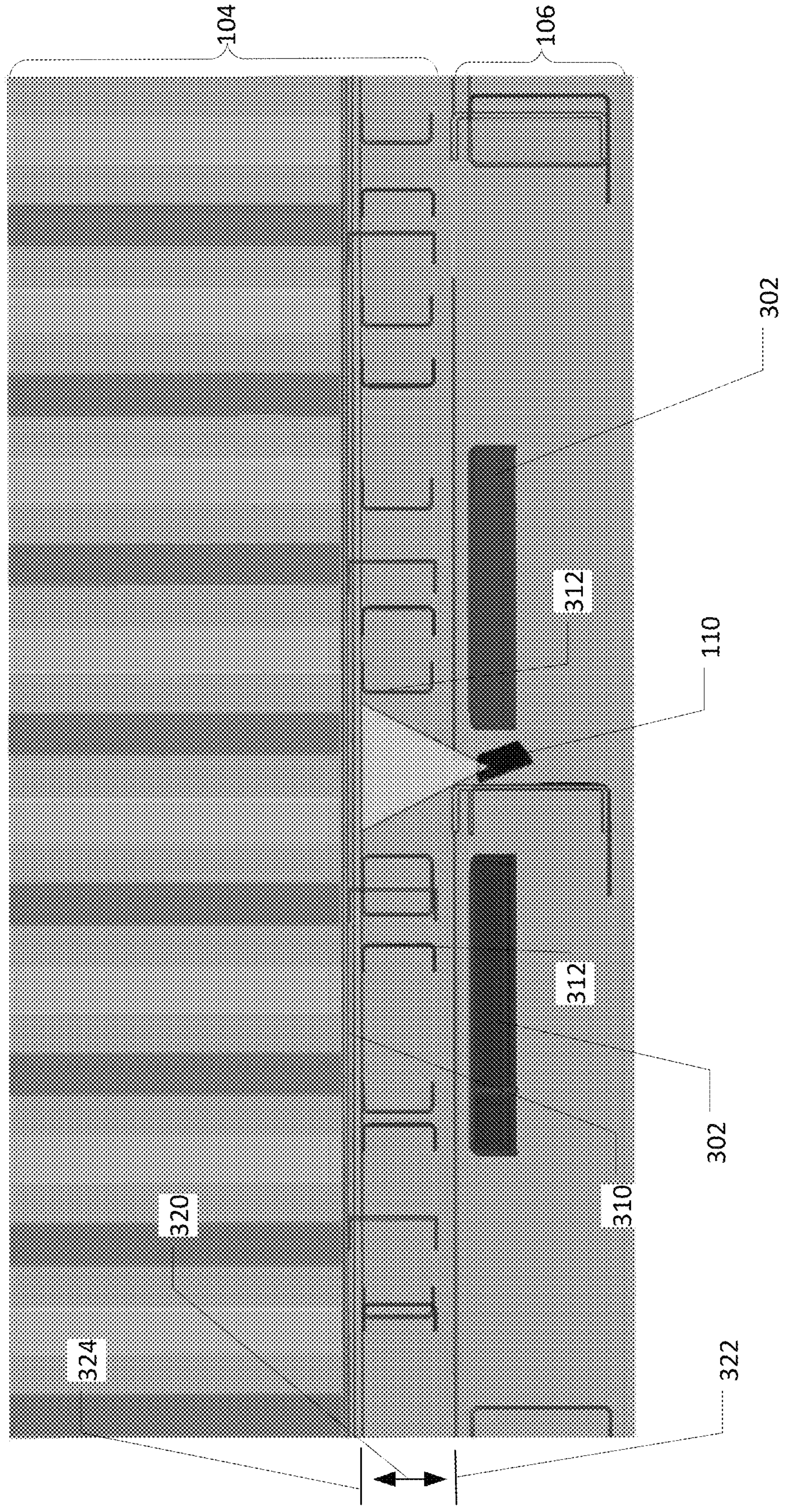
FIG. 4 shows another example of mounting of an asset tracking device to the transport chassis.
Figure 5:
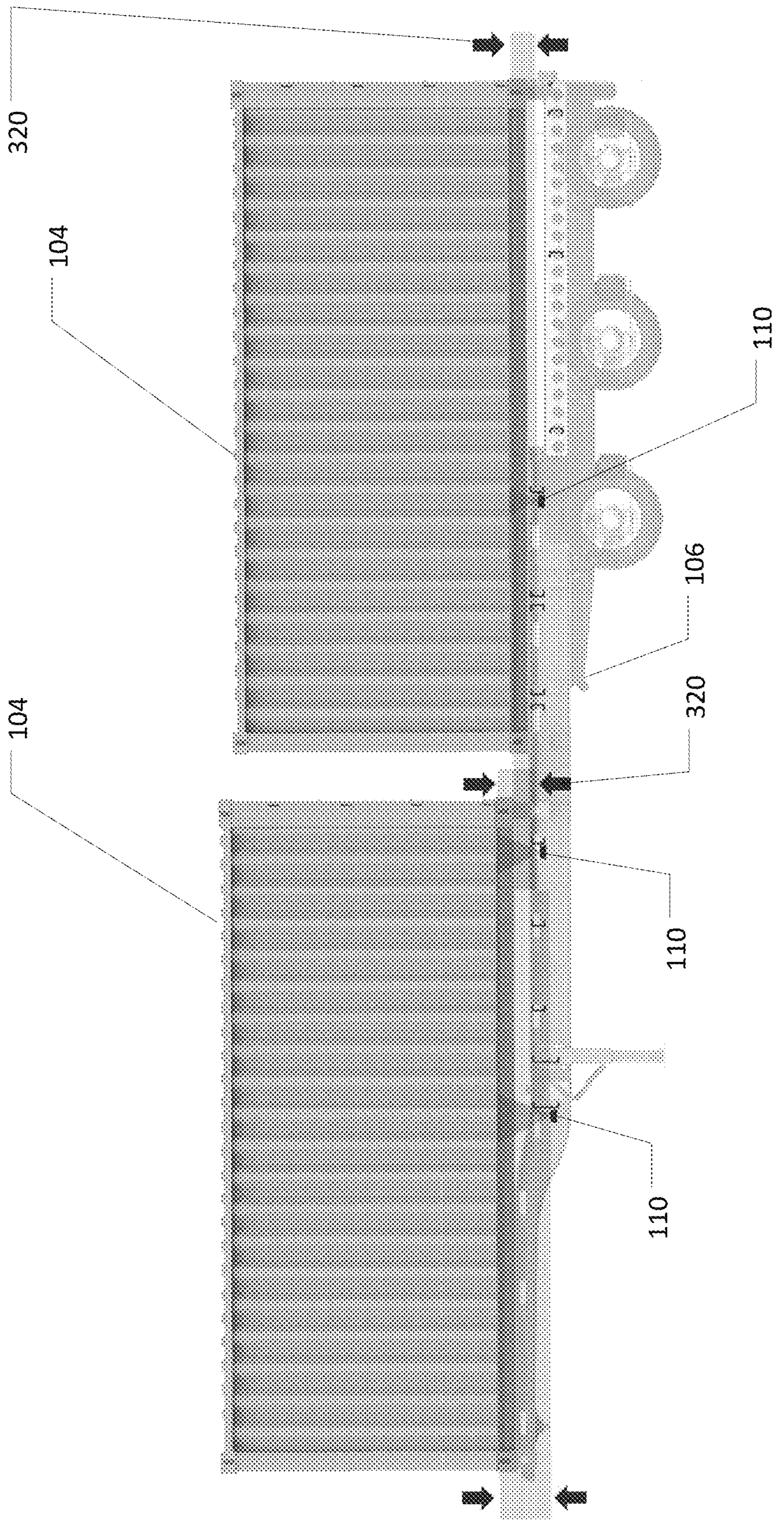
FIG. 5 shows yet another example of mounting of an asset tracking device to the transport chassis.

Reference is now made to FIGS. 3, 4, and 5, which diagrammatically illustrate the mounting of the asset tracking device 110 to the transport chassis 106 for detecting whether the container 104 is present.

As shown in FIGS. 3 and 4, the transport chassis 106 may structurally have a number of cross members 300 that span the distance between left and right-side rails of the transport chassis 106. In addition to cross members 300, the transport chassis 106 may include a plurality of other structural members, including for instance angled cross members 302. The various structural members may leave small gap such that the asset tracking device 110, if mounted with care, can be positioned so as to project the mmWave radar signal upwards through one of the gaps.

As shown in FIG. 3, if the asset tracking device 110 is mounted lower on the cross member 300, then the beamwidth of the mmWave radar signal may need to be narrower than if mounted higher on the cross member 300, such as is shown in FIG. 4. The beamwidth in FIG. 4 is wider than the beamwidth in FIG. 3. In one example, the beamwidth may vary from 20 degrees to over 53 degrees. The beamwidth may be configurable by way of software instructions, in some implementations in which the mmWave antenna 222 (FIG. 2) is an antenna array and the feed network to the antenna array provides sufficient signal control for beam shaping. In some cases, the beamwidth is fixed and the mounting location is to be selected to account for the beamwidth and to avoid excessive interference or blocking by structural members of the transport chassis 106. In some cases, the asset tracking device 110 may be mounted using an adjustable tilt bracket, so that the direction of the mmWave beam may be adjusted to minimize interference.

The asset tracking device 110 is configured to use mmWave radar to detect presence of a container based on reflected signals from a certain distance. A container may be detected within a container range 320 defined by a minimum distance 322 and a maximum distance 324. The container range 320 is the range within which a container may be expected to cause a reflected signal. The container range 320 changed depending on where the asset tracking device 110 is mounted to the crossbeam 300. The container 104 may include an underside 310 or bottom face. In many situations, the underside 310 may include a plurality of cross members 312 or other structural features, such as corrugations, ridges or the like.

As shown in FIG. 5, one or more asset tracking devices 110 may be mounted at various locations on the transport chassis 106, and the containers 104 may sit or mount differently at different locations on the transport chassis 106, meaning that the container range 320 may vary for different areas of the transport chassis 106. Accordingly, the container range 320 may be configurable and may be set for a particular asset tracking device after its installation.

Depending on the location of the container 104 on the transport chassis 106, the mmWave radar may receive a reflection from the underside 310, from one or more cross members 312, or from both. Moreover, the different structural members of both the container 104 and the transport chassis 106 can increase the likelihood of multipath reflections. Those reflections may, in different scenarios, create destructive or constructive interference that leads to ambiguities in the reflected signal that can result in false detection of a container present or false detection of no container.

Figure 6:
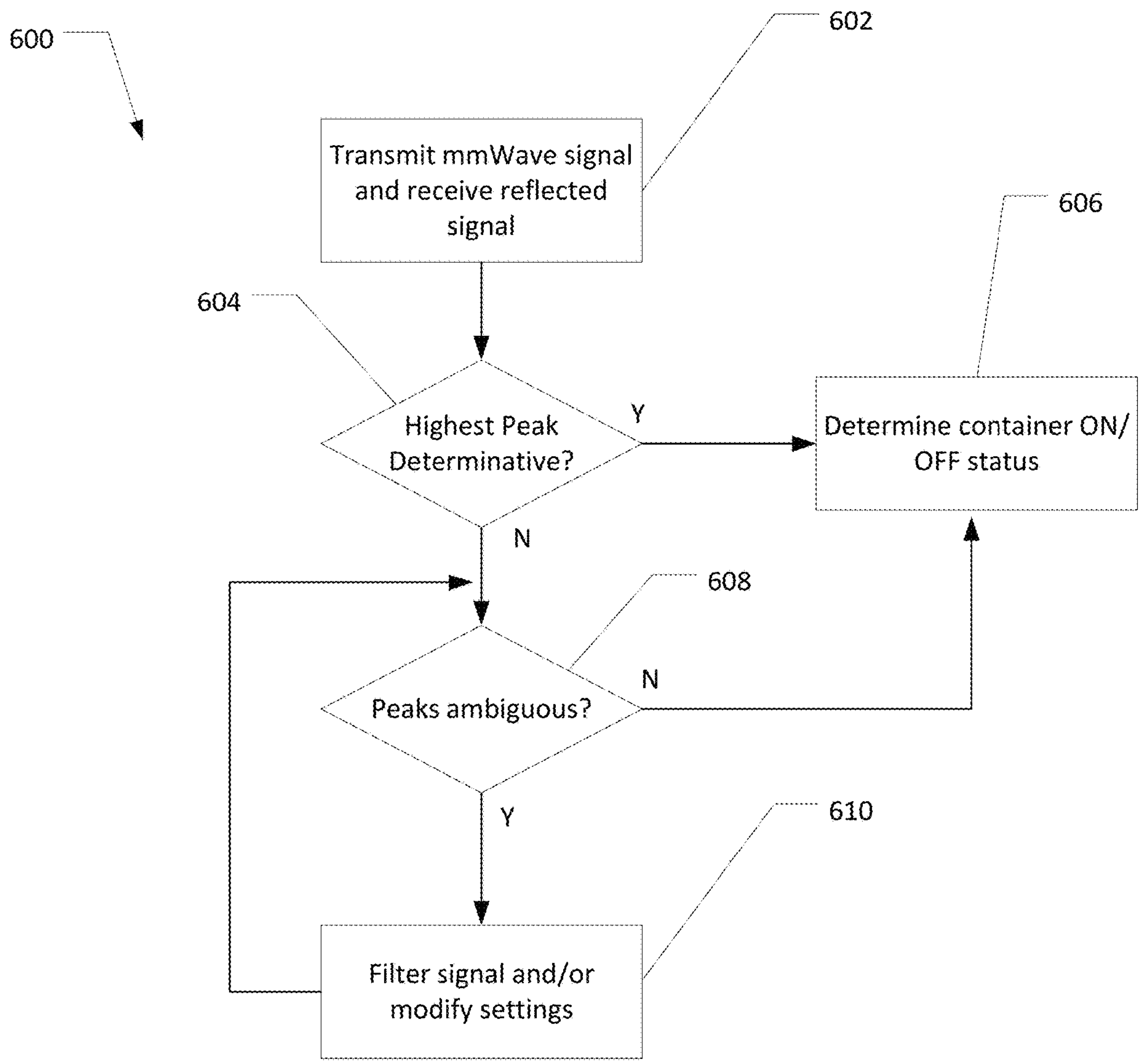
FIG. 6 shows a simplified example method of detecting container presence.

Reference is now made to FIG. 6, which shows, in flowchart form, one example method 600 for detecting container presence. The method 600 may be carried out by an asset tracking device mounted to a transport chassis and having a mmWave radar capability.

Prior to carrying out the method 600, the asset tracking device may be configured. For instance, it may be provided with the container range, i.e. the minimum distance and the maximum distance, which is then stored in memory. The container range and other configuration parameters may be set to the device wirelessly from the remote server or from a local device. In some instance, after installation the device may be an initiation or programmable mode in which it can connected to a local device, such as a mobile phone or laptop via a short-range wireless connection, and an application on the mobile phone or laptop is able to set and store configuration parameters in the device. In some cases, the method 600 may be conditional on the device determining from an orientation sensor that the device is oriented such that the mmWave radar is pointed upwards so as to be aimed at the underside of a container, e.g. within 0-45 degrees of vertical.

The device may be configured to determine and store a baseline no-container signal. For example, the device may be caused, by a local device or the remote server, to use the mmWave radar to receive a reflected signal(s) and to store the reflected signal values or signal pattern. The signal may be stored in raw form in some instances. In some cases, multiple readings may be taken and averaged and stored as the no-container signal. The signal may be stored as separate in-phase and quadrature phase signals, e.g. as an averaged in-phase signal and an averaged quadrature phase signal.

One of the parameters set in the device is a threshold magnitude for determining whether a reflected signal detected an object and, in particular, the container. The threshold magnitude may be adjusted based on the no-container signal to be set higher than any peak within the no-container signal.

The method 600 includes transmitting a mmWave signal and receiving a reflected signal, as indicated by operation 602. In operation 604, the device determines whether the reflected signal includes a highest peak that is determinative. In some cases, the highest peak is determinative if it is within the container range and is greater than the threshold. In some cases, the highest peak may be determinative if it meet those criteria and there is no other peak above the threshold. In some cases, the highest peak may be determinative if it is within the container range and is greater than the threshold and any other peak above threshold is also within the container range. In some cases, the highest peak is determinative in that there is no peak above threshold.

If the highest peak is determinative, then in operation 606 the device determines whether a container is present based on the reflected signal and reports the determination to the remote server. For example, if the highest peak is within the container range, the device may determine that the container is present and may so report. In another example, if there is no peak above threshold such that the highest peak is too low to constitute a detection, then the device may determine that there is no container present and may so report.

If the highest peak is not determinative, then the device may determine whether there is ambiguity in the reflected signal in operation 608. That is, the device may determine from the peaks in the reflected signal whether one or more of them appear to be possible multipath reflections that may cause a false positive or false negative determination of container presence.

In some cases, the device may be able to determine from the peaks whether a container is present or not. For example, the second highest peak may be within the container range and may be of sufficient magnitude that it exceeds the threshold. In such a case, the device may be able to determine that the container is present based on the second highest peak. In some cases, it may then determine that the highest peak is a multipath reflection and may report both the container ON condition and the multipath condition to the remote server in operation 606.

If the device cannot determine from the reflected signal whether a container is present or not in operation 608, then in operation 610 it may take a resolution action. The resolution action may include, in one example, filtering the reflected signal based on the stored baseline container-off signal. By subtracting the no-container signal from the reflected signal, the resulting signal may be disambiguated, in particular, through subtracting the no-container I/Q signals from the reflected signal I/Q samples. By filtering out the baseline condition, constructive or destructive multipath interference may be eliminated, which may result in a reflected signal that has no peaks above threshold or that has a peak above threshold and within the container range. The resulting container presence decision may then be reported to the remote server.

If the filtered reflected signal remains ambiguous, the device may attempt to disambiguate through increasing the signal strength of the mmWave radar in some implementations.

The resolution action may include modifying one or more parameters and re-testing. For example, the device may modify the signal strength, the threshold, the container range, the antenna receive gain, mmWave chirp parameters (e.g. slope, duration, etc.). Modification of one or more of the parameters may result in a less ambiguous reflected signal or a more determinative peak versus threshold assessment. The various parameters that may be tunable or adjustable in some implementations may include:

a. Min/Max distance measured by mmWave sensor
b. Noise threshold
c. Container range maximum
d. Container range minimum
e. Threshold level for container detection
f. mmWave sensor receive gain
g. mmWave sensor Tx power
h. Distance measurement algorithm tuning parameter (Min/Max segment, FFT points)
i. mmWave chirp parameters (No of chirps, slope, duration)

In some cases, when non-ambiguous no-container condition is determined, the device may update its stored baseline no-container signal to include the new signal data, such as through updating the averaged no-container signals stored in memory.

Figure 7:
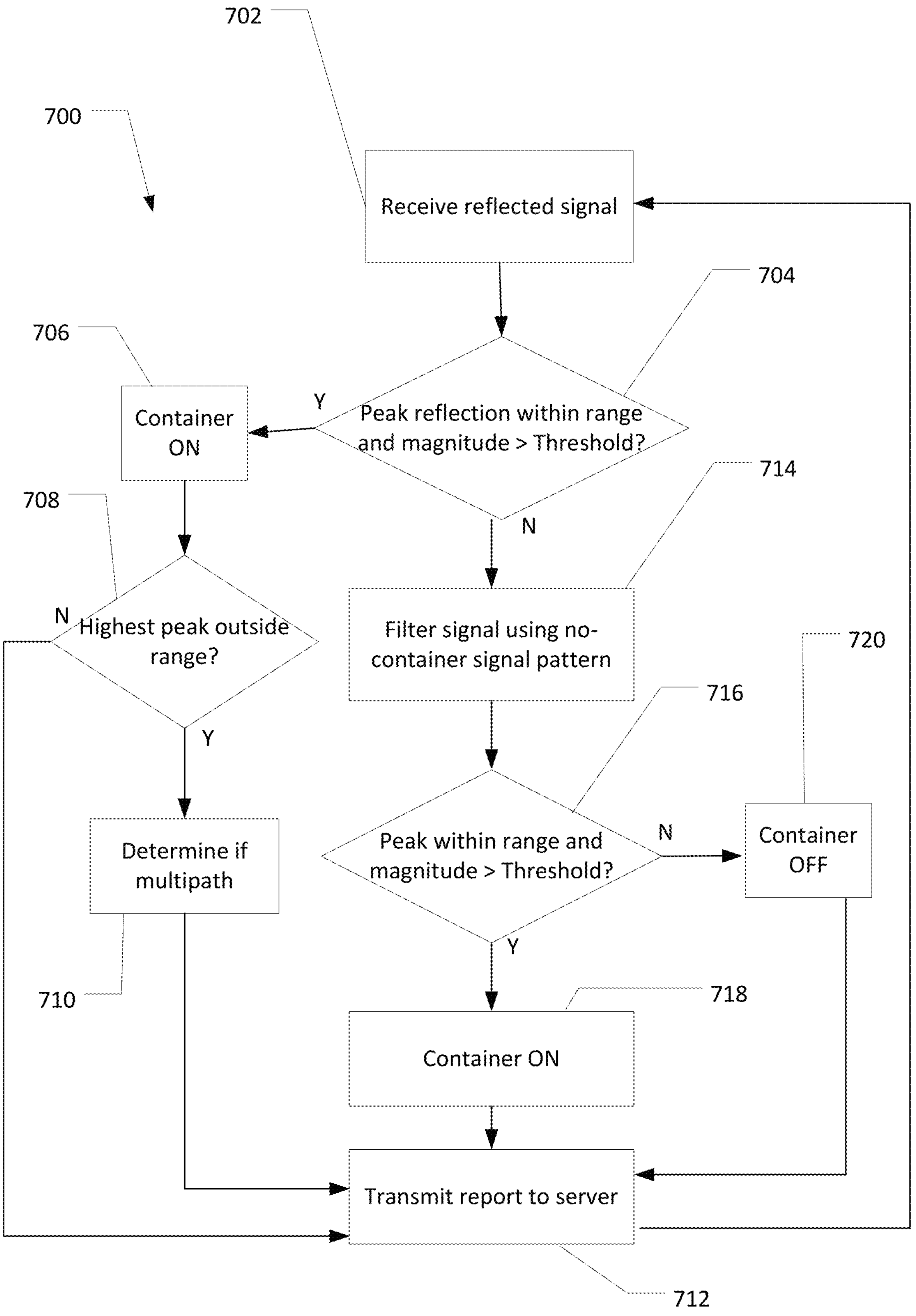
FIG. 7 shows another simplified example method of detecting container presence.

Reference is now made to FIG. 7, which shows, in flowchart form, one example method 700 for detecting container presence by an asset tracking device mounted to a transport chassis.

The method 700 includes, in operation 702, transmitting a mmWave signal and receiving a reflected signal. The device identifies one or more peaks within the signal and determines whether there is a peak higher than the threshold magnitude and within the container range. The reflected signal includes a series of samples, where the series samples represent the reflected power or intensity of the signal from a series of distances. The container range sets a minimum and maximum distance within which the device expects to see a larger-than-threshold magnitude reflection if there is a container present. If such a peak appears in the reflected signal then in operation 706 the device determines that there is a container present.

Even if there is a peak indicating that there is a container present, the remote server may gather data regarding possible multipath effects and which can be used to identify mounting location errors, correlate multipath effects to chassis or container types, alert other devices to multipath conditions, and perform other analysis or diagnostic operations. Accordingly, in operation 708, the device may determine whether the highest peak in the reflected signal is outside of the container range. If so, then it may assess whether there is a likely multipath reflection occurring in operation 710. The assessment may, in some cases, include determining whether the one of the peaks is approximately two-times the distance of the other of the peaks. That is, if there is a peak within the container range and there is a second peak at approximately two-times the distance, it may be indicative of a multipath set of reflections or an echo reflection. The device may assess whether the second peak is at twice the distances plus or minus a variance.

A report is transmitted to the remote server in operation 712 indicating the container status, that is whether there is a container present or not, and any multipath or other signal anomalies detected by the device.

If, in operation 704, there is no peak above threshold and within the container range, then the device may filter the reflected signal using the stored no-container signal in operation 714. That is the device may retrieve the no-container signal samples or average signal samples, as the case may be, and may normalize the reflected signal by subtracting the no-container signal samples to isolate the newly-reflected components. By subtracting the samples in the I/Q domain, the device may counter some of the destructive or constructive interference effects and may produce a filtered signal that better isolates the reflections.

In operation 716, the filtered reflected signal is then evaluated to assess whether it shows a peak value within the container range and above the threshold value. The threshold value used in operation 716 may be a lower threshold than the threshold used in operation 704 in some implementations. If there is now a peak that meets those conditions present in the filtered reflected signal, then the device may identify the container as being present in operation 718. If not, then the device may determine that the container is not present in operation 720. The determination is reported to the remote server in operation 712.

In some implementations, the device may look at the three highest peaks in evaluating whether the reflected signal meets the condition of operation 704. That is, it may look at a maximum of the three highest peaks to assess whether there is at least one that is within the container range and has a magnitude above the threshold.

In one example implementation, the mmWave radar is implemented using a mmWave sensor with a distance measurement capability between 100 mm-1 meter with +/−2 mm accuracy. The mmWave radar circuit may provide the device with distance, magnitude, and raw IQ samples from within its field of view on single shot measurement. In one example, the mmWave radar is implemented using frequency modulated continuous wave (FMCW) automotive mmWave Radar in the 77-81 GHz frequency range. In some cases, the 60 GHz mmWave frequency range may be used. In some cases, the commercial/industrial band at 24 GHz may be used. The radar may be FMCW or pulse coherent in some implementations.

In some cases, detection of a container on or off condition may trigger other operations on the device. For example, detection of a container on status may trigger the device to power up a short-range wireless chip and/or to broadcast a short-range wireless signal in order to look for and pair with an asset tracking device attached to the detected container. In some cases, detection of a container may trigger the device to cease looking for GNSS signals using the GNSS chip since the signals are likely to be blocked by the container presence. The device may relay on GNSS location detection by the tractor-mounted asset tracking device and/or the container-mounted asset tracking device until such time as it detects a no-container state.

In some cases, detection of a container includes pairing with a container-mounted asset tracking device and obtaining a unique identifier from the container-mounted asset tracking device. The unique identifier is then reported to the remote server so that the remote server can store an association between the container-mounted asset tracking device and the transport chassis-mounted asset tracking device.

The above discussed embodiments are considered to be illustrative and not restrictive. Certain adaptations and modifications of the described embodiments may be made. All such modification, permutations and combinations are intended to fall within the scope of the present disclosure.

What is claimed is:

1. A device for mounting to a transport chassis to detect whether a container is mounted on the transport chassis, comprising:
- a mmWave radar to transmit a mmWave signal upwards from a mounting location on the transport chassis and to receive a reflected signal;
- a wireless communication system; and
- a processor configured to execute stored processor-executable instructions that, when executed, are to cause the processor to:
  - identify a plurality of peaks in the reflected signal;
  - determine that a highest peak is reflected from a first distance outside a container range;
  - determine that a second highest peak is reflected from a second distance within the container range and at a magnitude greater than a minimum threshold, thereby indicating a detected container;
  - determine, based on the first distance and the second distance whether the highest peak is a multipath reflection; and
  - transmit a message to a remote server via the wireless communication system reporting detection of a container and the multipath reflection;
  - initiate short-range wireless pairing with a c container-mounted asset tracking device in response to the detected container;
  - obtain a unique identifier from the container-mounted asset tracking device; and
  - transmit, to the remote server, the unique identifier and an identifier of the device indicating an association between the container-mounted asset tracking device and the device.

2. The device of claim 1, wherein the instructions, when executed, are to cause the processor to determine the highest peak is a multipath reflection by determining that the second distance is twice the first distance plus or minus a variance.

3. The device of claim 1, wherein the instructions, when executed, are to cause the processor to identify the peaks by retrieving a stored average no-container signal and filtering the reflected signal using the stored average no-container signal to obtain a filtered signal.

4. The device of claim 3, wherein filtering includes subtracting in-phase and quadrature phase no-container signals from corresponding in-phase and quadrature phase components of the reflected signal.

5. The device of claim 1, wherein the instructions, when executed, are to cause the processor to:
- receive a second reflected signal;
- determine no peaks in the second reflected signal are above the threshold and within the container range; and
- transmit a no-container determination to the remote server.

6. The device of claim 5, wherein the instructions, when executed, are to further cause the processor to, based on the no-container determination, update a stored average no-container signal.

7. The device of claim 1, wherein the unique identifier of the container-mounted asset tracking device and the identifier of the device are transmitted in the message.

8. A method of detecting whether a container is mounted on a transport chassis using a chassis-mounted device, comprising:

transmitting a mmWave signal upwards from a mounting location on the transport chassis and receiving a reflected signal;

identifying a plurality of peaks in the reflected signal;

determining that a highest peak is reflected from a first distance outside a container range;

determining that a second highest peak is reflected from a second distance within the container range and at a magnitude greater than a minimum threshold, thereby indicating a detected container;

determining, based on the first distance and the second distance whether the highest peak is a multipath reflection; and transmitting a message to a remote server via a wireless communication system reporting detection of a container and the multipath reflection;

initiating short-range wireless pairing with a container-mounted asset tracking device in response to the detected container;

obtaining a unique identifier from the container-mounted asset tracking device; and transmitting, to the remote server, the unique identifier and an identifier of the device indicating an association between the container-mounted asset tracking device and the device.

9. The method of claim 8, wherein determining that the highest peak is a multipath reflection includes determining that the second distance is twice the first distance plus or minus a variance.

10. The method of claim 9, wherein identifying the peaks includes retrieving a stored average no-container signal and filtering the reflected signal using the stored average no-container signal to obtain a filtered signal.

11. The method of claim 10, wherein filtering includes subtracting in-phase and quadrature phase no-container signals from corresponding in-phase and quadrature phase components of the reflected signal.

12. The method of claim 8, further comprising:

receiving a second reflected signal;

determining no peaks in the second reflected signal are above the threshold and within the container range; and transmitting a no-container determination to the remote server.

13. The method of claim 12, further comprising, based on the no-container determination, updating a stored average no-container signal.

14. The method of claim 8, device wherein the unique identifier of the container-mounted asset tracking device and the identifier of the device are transmitted in the message.

15. A non-transitory computer-readable medium storing processor-executable instructions to detect whether a container is mounted on a transport chassis using a device configured to transmit a mmWave signal upwards from a mounting location on the transport chassis and to receive a reflected signal, wherein the instructions, when executed, are to cause the processor to:

identify a plurality of peaks in the reflected signal;

determine that a highest peak is reflected from a first distance outside a container range;

determine that a second highest peak is reflected from a second distance within the container range and at a magnitude greater than a minimum threshold, thereby indicating a detected container;

determine, based on the first distance and the second distance whether the highest peak is a multipath reflection; and transmit a message to a remote server via the wireless communication system reporting detection of a container and the multipath reflection;

initiate short-range wireless pairing with a container-mounted asset tracking device in response to the detected container;

obtain a unique identifier from the container-mounted asset tracking device; and transmit, to the remote server, the unique identifier and an identifier of the device indicating an association between the container-mounted asset tracking device and the device.

16. The non-transitory computer-readable medium of claim 15, wherein the instructions, when executed, are to cause the processor to determine the highest peak is a multipath reflection by determining that the second distance is twice the first distance plus or minus a variance.

17. The non-transitory computer-readable medium of claim 15, wherein the instructions, when executed, are to cause the processor to identify the peaks by retrieving a stored average no-container signal and filtering the reflected signal using the stored average no-container signal to obtain a filtered signal.

18. The non-transitory computer-readable medium of claim 17, wherein filtering includes subtracting in-phase and quadrature phase no-container signals from corresponding in-phase and quadrature phase components of the reflected signal.

19. The non-transitory computer-readable medium of claim 15, wherein the instructions, when executed, are to cause the processor to:

receive a second reflected signal;

determine no peaks in the second reflected signal are above the threshold and within the container range; and transmit a no-container determination to the remote server.

20. The non-transitory computer-readable medium of claim 19, wherein the instructions, when executed, are to further cause the processor to, based on the no-container determination, update a stored average no-container signal.

21. The non-transitory computer-readable medium of claim 15, wherein the unique identifier of the container-mounted asset tracking device and the identifier of the device are transmitted in the message.

* * * * *